June 15, 1926.
T. C. BROWNE
SIGNAL LIGHT CONSTRUCTION
Filed Jan. 24, 1923
1,588,522
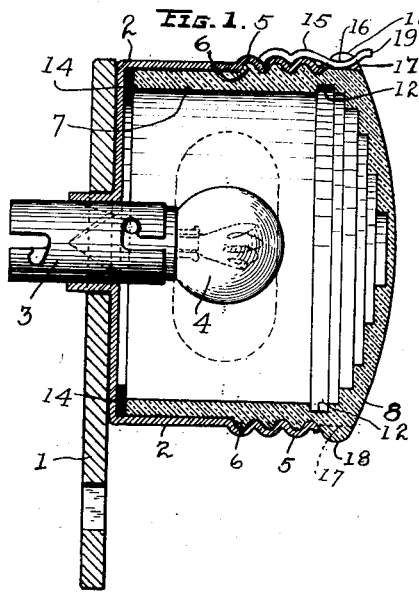
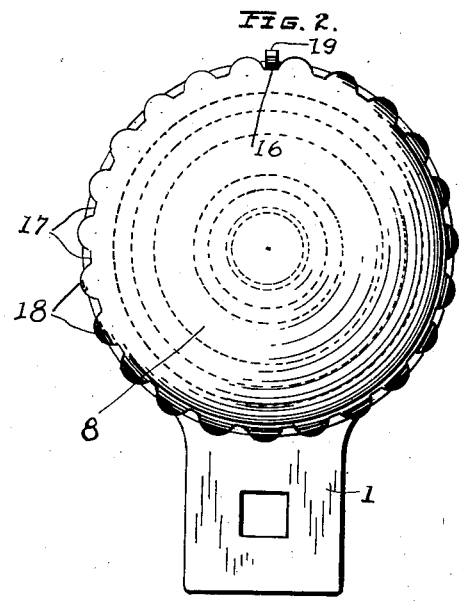
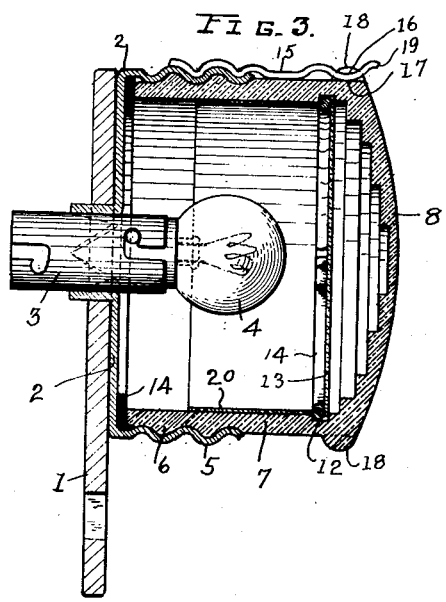
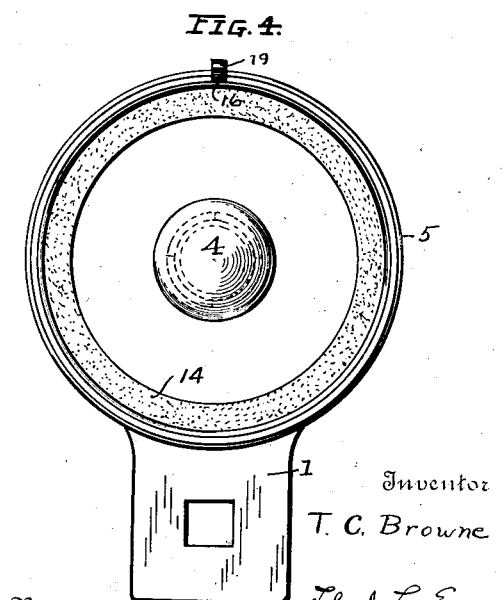
Inventor
T. C. Browne
Lloyd L. Evans
Attorney

Patented June 15, 1926.

1,588,522

UNITED STATES PATENT OFFICE.

THEODORE C. BROWNE, OF CLEVELAND, OHIO.

SIGNAL-LIGHT CONSTRUCTION.

Application filed January 24, 1923. Serial No. 614,546.

This invention relates to improvements in lamp structures designed to hold a suitable light such as an incandescent electric lamp.

An object of the invention is to provide a lamp that may be used for various purposes and in many places on automobiles and the like for illuminating or signal purposes.

A further object of the invention is to provide a lamp in which the light may be directed outwardly through a head and also through a suitable window or opening at the side and in which colored material may be interposed between the source of light and the head or between the light and the side, as desired, or to comply with any legal regulation.

A further object of the invention is to provide a lamp structure which may be utilized as a tail light for vehicles and which may serve both as a rear signal and as a means to illuminate the vehicle license.

Another object of this invention is to make a lamp structure which affords suitable protection for the lamp, which is substantially dust and moisture proof, and which is of simple construction and of more desirable arrangement of casing and lens.

Another object of the invention is to provide a metallic receiver and a hollow cylinder of glass having an integrally formed head, and a simple fastening means for removably holding the glass in the receiver.

Still another object is to provide a lamp having a transparent rim of a substantial substance such as glass, thereby furnishing a side window of durable construction.

These and other objects will be apparent from the following description of my invention.

In the accompanying drawings forming a part of this specification:—

Figure 1 is a vertical section through the lamp structure.

Fig. 2 is a front elevation.

Fig. 3 is a vertical section of a slightly modified construction.

Fig. 4 is a front elevation of the metallic member.

Secured to any suitable attaching base 1 is a cup-shaped metal member 2 in which is centrally mounted a socket 3 of usual construction to receive the bulb 4. The member 2 is screw threaded as at 5 to receive the threads formed integrally on the skirt 6 of a cup-shaped transparent or translucent member 7, which may be formed of glass or of any other suitable material and comprises a head 8 and an integral cylindrical skirt 6. The head 8 may be shaped to form a lens, as shown, or may be flat or curved, as desired.

To render the lamp dust and weather proof a suitable annular packing 14, such as rubber, can be employed against which the edge of the skirt 6 engages when the glass member is firmly screwed into place. In order to easily and yet detachably secure the glass member to the metallic receiver 1 have provided a spring clip 15 which may have one end secured to the metal member by any suitable means, such as soldering or spot welding, permitting the outer portion 16 to yieldably engage detents 17 between the integrally formed projections 18 on the glass member. The outer end 19 of the spring clip 15 may be turned upwardly so that it may be easily engaged to lift it free of the projections 18 for the ready insertion and removal of the glass member from the metal receiver.

As shown in Fig. 1, the metallic member 2 encloses and protects substantially the entire skirt of the glass member. An opening $2^a$ of any desired shape may be formed in the metallic member to permit light to shine through, for example to illuminate an object such as a license plate, if the device is to be used for the tail light of a vehicle.

As shown in Fig. 3, the metallic member may cover only a portion of the glass skirt, and the inside of the skirt of the glass may be lined with a strip 20 of transparent or translucent material of any color and which may be continuous or may have openings therethrough, as desired. Also a disc 13 of any transparent or translucent material may be placed in the annular groove 12 formed or molded in the inner wall of the glass member and held in place by a suitable means such as the spring retaining means 14, and either the strip 20 or disc 13 may be easily removed and ones of different color substituted if desired.

The member 7 and its head 8 may be formed of transparent or translucent glass and then glass of any desired color may be "flashed" onto the head or the skirt, as is well known.

It will thus be seen that I have provided a relatively cheap and efficient construction and one in which a relatively durable, strong side window is provided. Also that I have provided a construction which is capable of various uses in connection with automobiles and vehicles and the like, or for signaling purposes.

It will also be seen that I have provided the screw threads in the metal member near the outer edge of the skirt which makes it more accessible to form them with a tool. The glass member is molded and consequently the thread can be formed conveniently anywhere along the skirt.

While I have used the words "translucent" and "transparent" in referring to the member 7 and the liners 20 and 14, it is to be understood that they are to mean in the specification and claims any material capable of transmitting light, the object being to so transmit light that it is visible either for signaling or illumination purposes. Such material may be either substantially transparent, or partly transparent.

Furthermore it is to be understood that the particular forms of apparatus shown and described and the particular procedure set forth are presented for purposes of explanation and illustration and that various modifications of said apparatus and procedure can be made without departing from my invention as defined in the appended claims.

What I cliam is:—

1. A lamp comprising a cup-shaped metallic receiver having its skirt screw threaded, a cup-shaped member to transmit light having its skirt correspondingly threaded and having a head, projections surrounding the head, a packing member between the bottom of the metallic receiver and the edge of the member and a yielding means for detachably locking the receiver and member against relative movement, said means comprising a spring member to engage between two of said projections.

2. A lamp comprising a cup-shaped metallic receiver having its skirt screw threaded, the bottom having a lamp socket secured thereto, a cup-shaped member to transmit light having a skirt correspondingly threaded, the head of said member forming a lens, a packing between the bottom of the receiver and the edge of said member, a series of projections arranged around the head of said member and spring means mounted on said receiver to engage between said projections to prevent relative movement between said member and receiver.

3. A lamp comprising a cup-shaped metallic receiver having its skirt screw-threaded, a cup-shaped member to transmit light having a cylindrical skirt integrally threaded, the skirt of the receiver substantially enclosing the skirt of the member, an opening in the skirt of the receiver and means to detachably secure the receiver and member against relative movement.

4. A lamp comprising a metallic receiver having a bottom and a cylindrical skirt, means in the bottom for supporting a lamp socket, a glass member comprising a head and a cylindrical skirt, the skirt of the receiver being threaded remote from said bottom, the skirt of the glass member being threaded to engage the threads of the receiver, and means to detachably hold the glass member and receiver against relative movement.

5. A lamp comprising a metallic receiver having a base and a skirt, a glass member having a skirt and an integral head shaped to form a lens, said member being detachably secured to the receiver against relative movement, the skirt of the receiver covering a substantial portion of the skirt of said member, a lamp socket supported from the base of the receiver, and means for positively holding a colored liner between the lens and the lamp socket, said means being removable from the glass member to permit insertion or removal of said liner.

In testimony whereof, I hereunto affix my signature.

THEODORE C. BROWNE.